Nov. 4, 1924.  
J. L. McMULLEN  
VEHICLE SPRING  
Filed Oct. 12, 1923  
1,514,063

Inventor  
James L. McMullen  
By Lancaster and Alwine  
Attorney

Patented Nov. 4, 1924.

1,514,063

UNITED STATES PATENT OFFICE.

JAMES L. McMULLEN, OF DALLAS, TEXAS.

VEHICLE SPRING.

Application filed October 12, 1923. Serial No. 668,201.

*To all whom it may concern:*

Be it known that I, JAMES L. MCMULLEN, a citizen of the United States, residing at Dallas, in the county of Dallas and State of Texas, have invented certain new and useful Improvements in Vehicle Springs, of which the following is a specification.

This invention relates to improvements in vehicle springs.

The primary object of this invention is the provision of a vehicle spring composed of a plurality of superposed leaves, and embodying novel spacing and securing means for the same.

A further object of this invention is the provision of a novel type of vehicle spring which includes a plurality of superposed leaves so connected as to render the spring very flexible and easy riding, without sacrificing the strength of the same.

A further object of this invention is the provision of a vehicle spring of the above described character, the leaves of which are so connected that each leaf is insured of careful leverage connection to the proximate leaves to give maximum strength to the spring.

A further object of this invention is the provision of a vehicle spring of the above described character including a plurality of leaves which are so connected as to obviate friction to a great degree and to render the spring susceptible of easy oiling.

Other objects and advantages of this invention will be apparent during the course of the following detailed description.

In the accompanying drawing, forming a part of this specification, and wherein similar reference characters designate corresponding parts throughout the several views, Figure 1 is a front elevation of the improved vehicle spring, showing one application of the same upon a vehicle.

Figure 1:
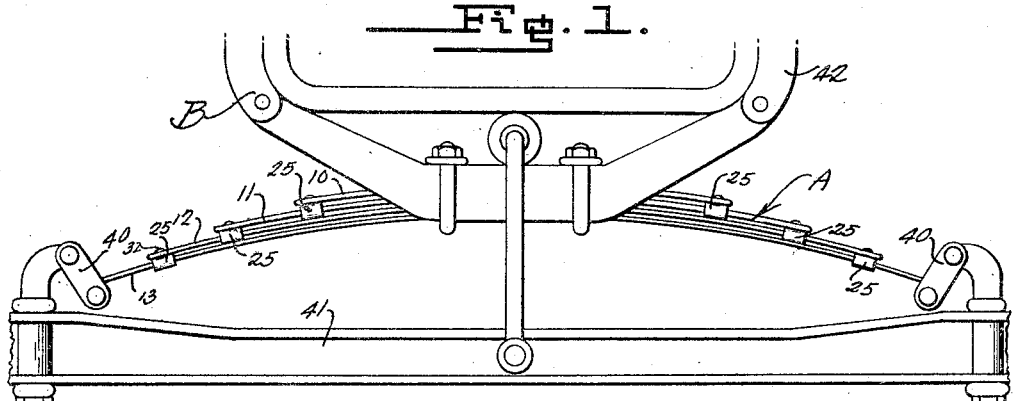
Figure 2:
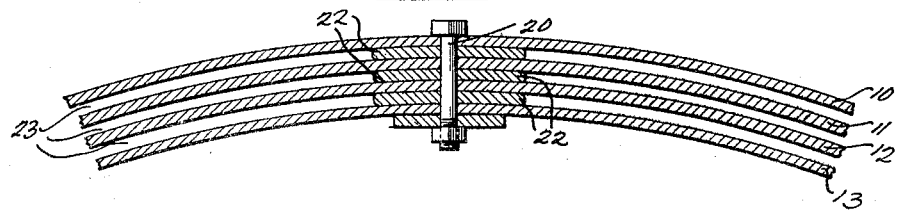
Fig. 2 is a fragmentary cross sectional view taken through the intermediate portion of the improved spring.
Figure 4:
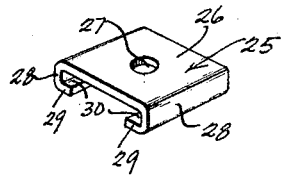
Fig. 4 is a perspective view of a novel type of securing clip, used in the construction of the improved spring.

In the drawing, wherein for the purpose of illustration is shown but the preferred embodiment of this invention the letter A may generally designate the improved vehicle spring which may be adapted for use upon a vehicle B.

Referring to the novel construction of the improved vehicle spring A, the same preferably includes a plurality of superposed arcuate leaves 10, 11, 12 and 13, which in accordance with vehicle spring construction are of unequal lengths and so relatively disposed that the shorter leaves are at the convex side of the spring A increasing in length toward the concave side of the spring; the lowermost spring 13 having the ends 15 thereof looped for shackle connection to a vehicle part.

The spring leaves 10, 11, 12 and 13 are preferably relatively connected intermediate their ends by means of a bolt 20 transversely inserted through apertures thereof; said apertures being substantially midway of the ends of each of said leaves. Spacing blocks or pieces 22, preferably of metal, are disposed intermediate the leaves, to provide spaces 23 between proximate or adjacent leaves.

A novel type of clip 25 is riveted or otherwise fixedly connected at the ends of each of the spring leaves. This clip 25 is preferably U-shaped, including a relatively flat body portion 26 having a central aperture 27 therethrough. At its opposite sides the clip 25 is downwardly flanged, as at 28; said flanges at their free portions being inturned, as at 29, below the lower surface of the flat body portion 26, to provide pockets 30 in facing relation.

Figure 3:
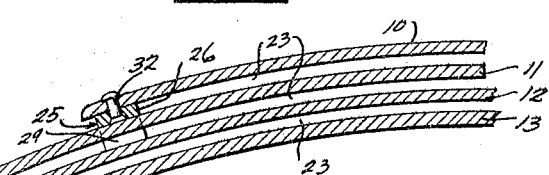
Fig. 3 is a fragmentary cross sectional view taken through an end portion of the improved spring.
Figure 3:
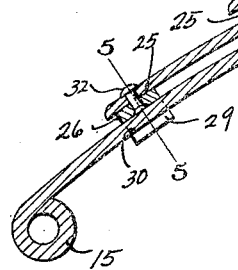
Figure 5:
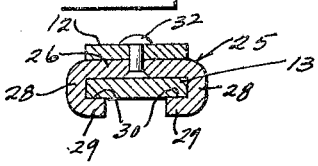
Fig. 5 is a transverse cross sectional view taken substantially on the line 5—5 of Figure 3.

The clips 25, as before mentioned are secured at the ends of each of the spring leaves. This attachment of the clips is at the under or concaved surface of each of the spring leaves; the top surface of the clip body portion 26 lying in abutting relation with the under surface of the spring leaves adjacent the ends of the spring leaves, substantially as is illustrated in Figure 3 of the drawing, and being riveted in such position by means of rivet elements 32. In this position the clip flanges 28 depend below the concave surface of the leaf so that the same are disposed adjacent the side marginal edges of the spring leaves. The next lower leaf is slidably secured or inserted through the pockets or recesses 30 provided by the clips 25. It can thus be seen that the spring leaves 10, 11, 12 and 13 are spaced from each other for a distance equivalent to the thickness of the clip body portion 26. This thickness of the body portion 26 is exactly the same as the thickness of the intermediate spacers 22, so that the space 23 between adjacent spring leaves is the same from one end of the spring to the other. As the leaves of the spring are slidably disposed through the pockets 30 of the clips 25, it can readily be understood that relative movement at the ends of the spring leaves is permitted.

From the foregoing description of this invention it is apparent that a vehicle spring has been provided, the leaves of which are connected in the best possible manner. The leaves are secured intermediate their ends in proper manner and in spaced relation. At the ends the leaves of the spring are slidably connected in positive manner to the lower adjacent leaves. This insures a proper leverage connection of the leaves, so that when a load is disposed upon the spring A each leaf will insure a proper leverage for proportionate support of the load, so that the spring A is at all times in condition to receive a maximum load thereon. This is not so of ordinary leaf springs, the leaves of which are in abutting relation. Incident to the spaces 23 provided between the proximate leaves of the spring, the task of lubricating the spring is facilitated. It is apparent that there is less frictional engagement and resistance offered to this type of spring than is the case with the ordinary type of leaf spring, as the leaves are only connected at their intermediate portions and at their ends. Because of the flexibility of the spring and the ease with which the same operates, ordinary shock absorbers may be done away with on the vehicle to which the improved spring A is attached. The application of the spring A, as illustrated in Figure 1 of the drawing is merely by way of example, having the looped ends 15 of the lowermost spring leaf 13 oscillatively connected to an axle 41 as by shackles 40. The vehicle body 42 may be connected or find support at the intermediate portion of the spring A, so that it may be resiliently supported.

Various changes in the shape, size, and arrangement of parts, such as the substitution of any desired number of leaves, may be made to the form of invention herein illustrated and described, without departing from the spirit of the invention or the scope of the claims.

I claim:

1. A spring comprising a plurality of superposed leaves, and clips secured at the under surfaces of said leaves and adjacent the ends thereof, said clips having inturned side flanges to provide pockets for slidably receiving an adjacent leaf therein.

2. A spring comprising a plurality of superposed leaves, spacing strips between said leaves intermediate the length of the spring, a fastener passing through said leaves and strips, clamp forming strips secured to the under faces of the leaves adjacent their ends and extending beyond the side edges of the leaves and bent downwardly and inwardly and extending beneath lower leaves to slidably connect the end portions of the leaves with lower leaves and hold the portions of the leaves between the clamp forming strips and spacing strips in spaced relation to each other.

JAMES L. McMULLEN.